United States Patent [19]
Owen

[11] Patent Number: 5,334,982
[45] Date of Patent: Aug. 2, 1994

[54] AIRPORT SURFACE VEHICLE IDENTIFICATION

[75] Inventor: Lee A. Owen, Southbury, Conn.

[73] Assignee: Norden Systems, Inc., Norwalk, Conn.

[21] Appl. No.: 68,478

[22] Filed: May 27, 1993

[51] Int. Cl.$^5$ ............................................. G01S 13/87
[52] U.S. Cl. ...................................... 342/36; 342/32; 342/37
[58] Field of Search ............................. 342/30, 32, 37

[56] References Cited

U.S. PATENT DOCUMENTS

| | | | |
|---|---|---|---|
| Re. 32,368 | 3/1987 | Funatsu et al. | 342/45 |
| 3,152,327 | 10/1964 | Barker | 343/8 |
| 3,665,313 | 5/1972 | Trent | 325/55 |
| 3,697,941 | 10/1972 | Christ | 340/23 |
| 3,872,474 | 3/1975 | Levine | 343/5 |
| 3,900,846 | 8/1975 | Gibbon et al. | 342/37 |
| 4,197,536 | 4/1980 | Levine | 342/37 |
| 4,319,243 | 3/1982 | Vachenauer et al. | 342/37 |
| 4,454,510 | 6/1984 | Crow | 342/30 |
| 4,733,241 | 3/1988 | Litchford et al. | 342/37 X |
| 4,819,174 | 4/1989 | Furuno et al. | 364/444 |
| 4,912,334 | 3/1990 | Anderson | 250/495.1 |
| 5,111,400 | 5/1992 | Yoder | 364/424.01 |
| 5,179,384 | 1/1993 | De Haan | 342/37 |
| 5,200,902 | 4/1993 | Pilley | 364/439 |
| 5,218,360 | 6/1993 | Goetz et al. | 342/407 |

FOREIGN PATENT DOCUMENTS 289657 9/1988 European Pat. Off. .

OTHER PUBLICATIONS

Hollister, Walter M., "Airport Surface Traffic Automation Study", Technical Report, May 9, 1988, (55 pages).
Lyon, Ervin F., "Airport Surface Traffic Automation", The Lincoln Laboratory Journal, vol. 4, No. 2, 1991, pp. 151-188.

*Primary Examiner*—Mark Hellner
*Attorney, Agent, or Firm*—Patrick J. O'Shea

[57] ABSTRACT

An airport vehicle identification system includes a ground surveillance radar system which radiates both a conventional radar signal and a beacon interrogation signal. The radar receives i) a backscatter signal from the skin returns of a target and ii) an encoded ID signal indicative of the target identity. The encoded ID signal is transmitted by a vehicle (e.g., an aircraft) mounted transponder in response to receiving the beacon interrogation signal. The transponder can be located within an external vehicle light housing such as an aircraft collision avoidance light. This invention fills the critical void in airport traffic control of providing ground controllers with electronic airport surface surveillance data which includes both vehicle position and identity.

15 Claims, 6 Drawing Sheets fig.2 fig. 3 fig.4A fig.4B

AIRPORT SURFACE VEHICLE IDENTIFICATION

DESCRIPTION

Technical Field

This invention relates to an airport ground traffic control radar system, and more particularly to a system for detecting, tracking and identifying vehicles on an airport surface to improve airport collision avoidance.

Background Art

Unauthorized incursions of aircraft and ground vehicles onto runways and taxiways can often have catastrophic results. The number of aircraft accidents that occur on the ground is nearly three times the number of aircraft accidents that occur in the air.

In degraded visual conditions the problem becomes even greater since the ground controller is often reliant on non-visual information such as voice communication from the cockpit crew reporting the aircraft's current position on the airport surface, or display information from a ground surveillance radar system. Unfortunately, only the largest airports in the United States have ground surveillance radar systems to aid the controller. The Federal Aviation Administration (FAA) is addressing this problem by installing ASDE-3 ground surveillance radars in twenty-nine U.S. airports and the FAA Training Academy. The remainder of the U.S. airports depend solely on the visual observations of the controller and position reports from pilots. The problem gets even worse. The majority of ground surveillance radar systems other than ASDE-3 are often over twenty-five years old, difficult to maintain, and provide ironically inadequate information in poor weather when radar is needed most. As a result, the controller in the tower is almost completely reliant on his visual observations and surface position reports from aircraft crew to provide situational awareness of the current state of the airport surface. In degraded visual conditions, the controller is literally often asking the question "where are you? " to aircraft crews to provide his situational awareness of the airport surface. As a result, the controller has to maintain a mental image of the airport surface, rather than having hard surveillance data available.

The current state of surface traffic control and several solutions to this problem are discussed in an article entitled "Airport Surface Traffic Automation" written by Ervin F. Lyon and published in The Lincoln Laboratory Journal, Volume 4, Number 2, 1991. The article discusses several alternatives such as the Airport Surface Traffic Automation (ASTA) plan of the Federal Aviation Administration, and the Airport Movement Area Safety System (AMASS) currently under development by Norden Systems, a subsidiary of the assignee of the present invention. AMASS operates in conjunction with the ASDE-3 ground surveillance radar which utilizes high resolution radar electronic surveillance data to provide tower controllers with all weather surface surveillance capability. AMASS processes the ASDE-3 data to detect and track airport ground traffic, predict where the ground traffic will be a fixed time later (e.g., 10 seconds), and alert controllers of possible runway incursions and ground collisions with sufficient time to allow corrective action to be taken. However, neither the AMASS nor the ASDE-3 currently include the ability to identify vehicles on the airport surface.

One proposed system for identifying (i.e., tagging) vehicles on the airport surface includes the use of a surface Mode-S beacon system having approximately "five to seven simple stationary antennas and associated electronics around the periphery of the airport". However, such a system is complex and expensive due to the need for several antennas and associated electronics placed about the surface of the airport. In addition, not all aircraft are required to be equipped with a Mode-S transponder. Furthermore, airport vehicles such as plows, catering trucks and tugs are not required to be equipped with any type of transponder.

In order to provide the advantages of vehicle identification to as many airports as possible, a lower cost identification system which can be integrated into existing systems is required to identify aircraft and vehicles and thus improve airport collision avoidance technology.

DISCLOSURE OF THE INVENTION

An object of the present invention is to provide airport ground situational awareness information to aircraft ground controllers, including tag information to identify a detected target.

Another object of the present invention is to automatically generate and display status information to airport ground controllers indicative of target identity and target position on airport runways, taxiways, and other critical airport ground traffic areas.

Yet another object of the present invention is to provide a low power aircraft mounted transponder which is easily retrofitted into existing aircraft.

According to the present invention, an airport ground surveillance system capable of detecting and identifying vehicles on the surface of the airport includes a vehicle mounted transponder which is interrogated by a ground surveillance radar and in response to the interrogation provides information indicative of the vehicle's identity.

According to another of the aspect of the present invention, an interrogation pulse train signal is incorporated within a radiated radio frequency (RF) pencil beam from the ground surveillance radar, and a vehicle transponder responds to the interrogation signal with data indicative of the vehicle's identity.

According to yet another aspect of the present invention, the aircraft mounted transponder is located within an external vehicle light housing such as an aircraft collision avoidance light.

The present invention provides air traffic controllers with situational awareness data indicative of vehicle position on the airport surface and the identity of each detected vehicle on the airport surface. Aircraft, tugs, plows and other vehicles which typically operate on the surface of an airport (thus creating a potential for collision with an aircraft) can be equipped with a transponder to provide target identity information to the ground radar surveillance system.

The transponder is easily retrofitted into existing aircraft since it can be located within an aircraft collision light, and hence installation of the transponder can be achieved without making holes in the aircraft skin to accommodated the transponder.

These and other objects, features and advantages of the present invention will become more apparent in light of the following detailed description of a preferred embodiment thereof, as illustrated in the accompanying drawings.

BEST MODE FOR CARRYING OUT THE PRESENT INVENTION

Figure 1:
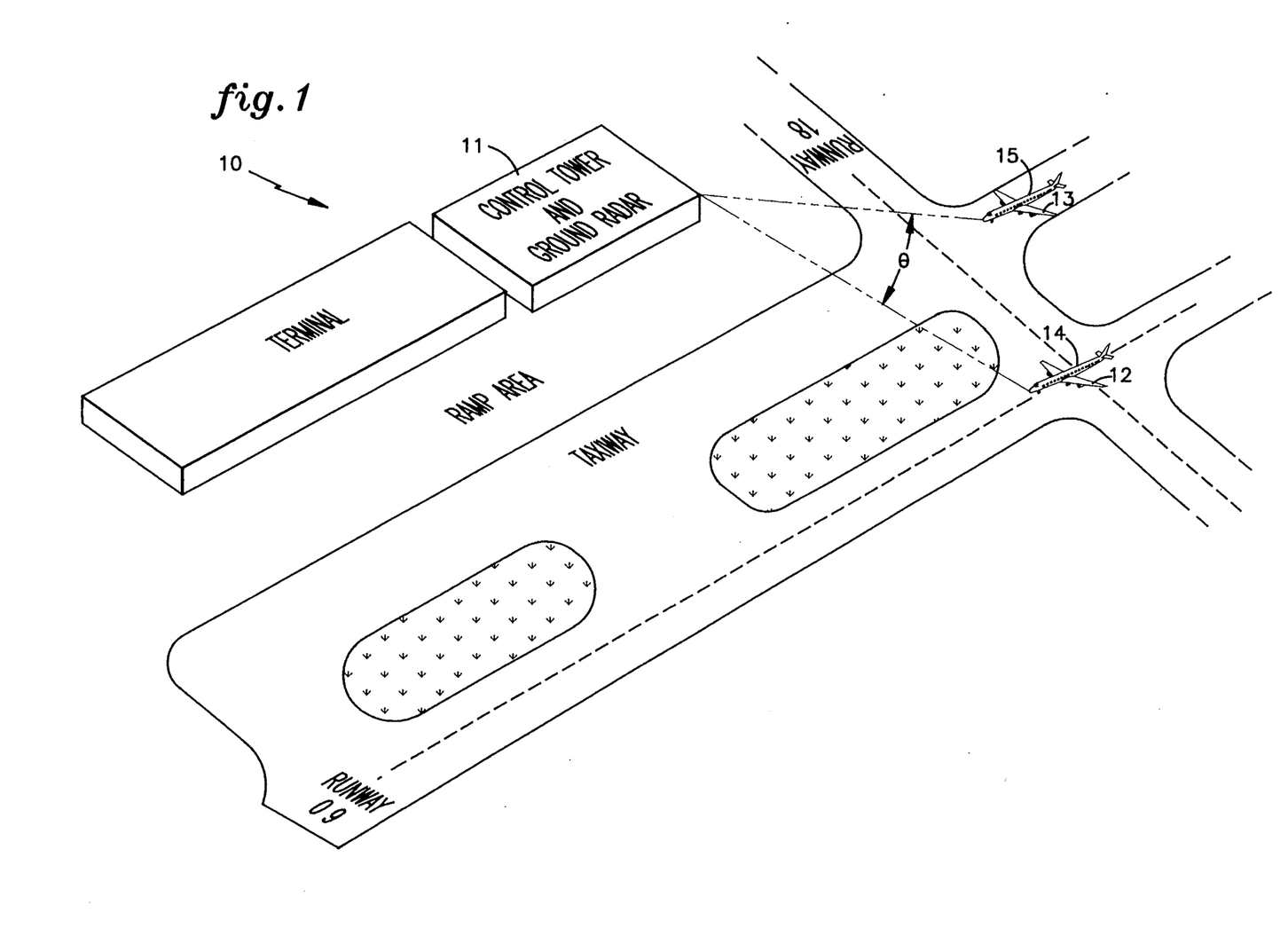
FIG. 1 is an illustration of the operational environment of the present invention.

Referring to FIG. 1, the operational environment of the present invention is the surface of an airport 10. The airport includes a ground radar surveillance system 11 which detects and tracks vehicles (e.g., aircraft, trucks, cars, helicopters) on the airport surface. An example of the ground radar surveillance system 11 is the ASDE-3 radar system produced by Norden Systems, Inc., a subsidiary of the assignee of the present invention. The ASDE-3 displays all vehicles that can be detected by primary surface radar out to about four nautical miles in range and up to approximately two hundred feet above ground level. First and second aircraft 12,13 respectively each include a transponder 14,15 which is interrogated by the ground radar surveillance system 11 and in response each transponder provides an encoded signal indicative of its corresponding aircraft's identity.

Figure 2:
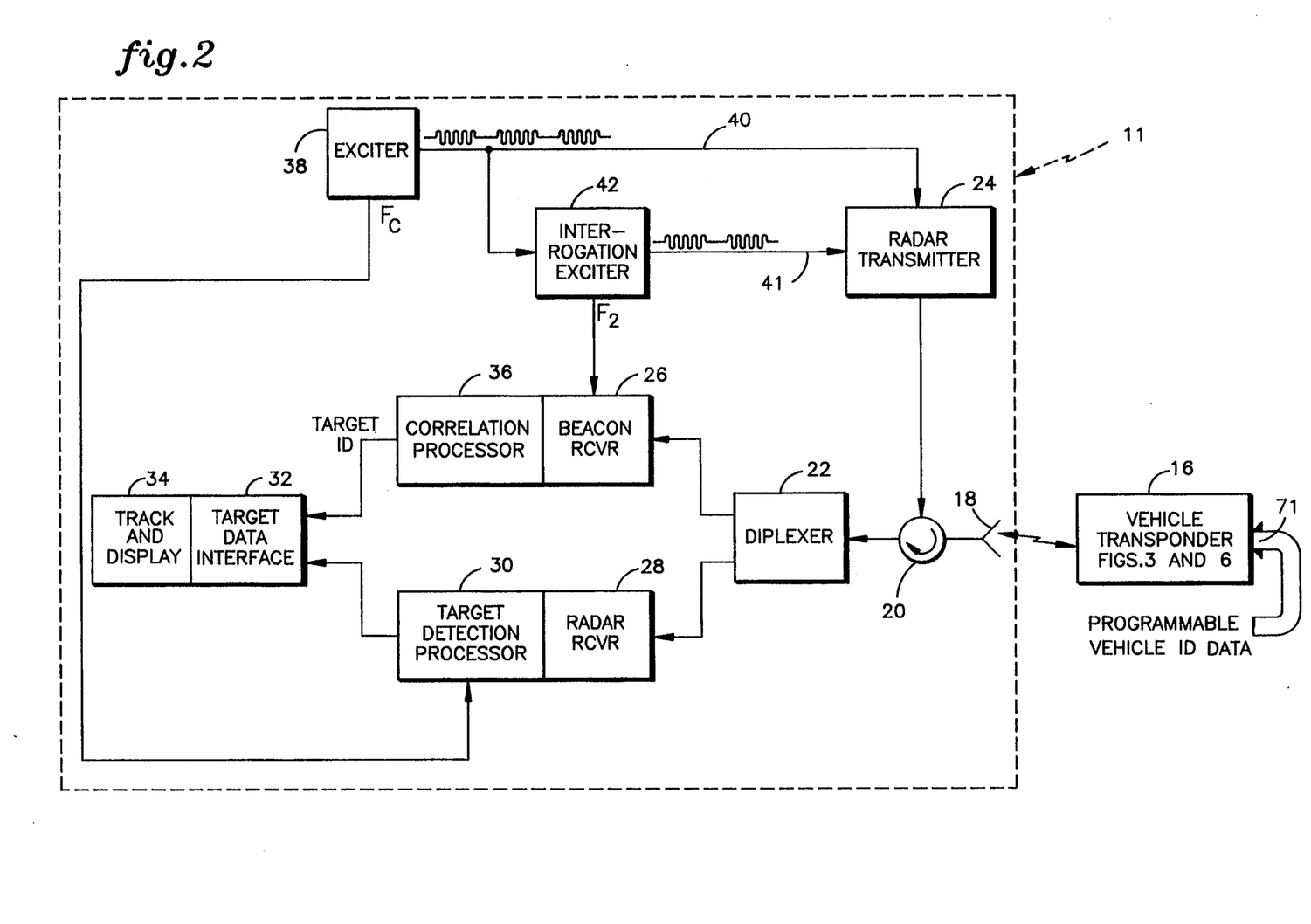
FIG. 2 is an functional block diagram of the present invention.

Referring to FIG. 2, the present invention includes two primary components: the ground radar surveillance system 11 and the vehicle mounted transponder 16. The ground radar surveillance system 11 is a pulsed radar system that includes a rotating antenna 18 which receives signals from and provides data to a circulator 20. The circulator 20 routes a received signal to a diplexer 22 and receives a transmit signal from a radar transmitter 24. The diplexer 22 routes the received signal from the circulator 20 to both a beacon receiver 26 and a radar receiver 28. The beacon receiver 26 is tuned to receive data from the transponder 16 indicative of the vehicle's identity, while the radar receiver 28 is tuned to receive data indicative of the vehicle's position on the surface of the airport. Beacon receiver 26 includes a linear electronic interface, while the radar receiver is typically a log receiver with automatic gain control based upon clutter range, etc. The radar receiver 28 provides a signal to a radar target detection processor 30 containing advanced digital signal processing algorithms to detect a target against clutter while providing an operationally acceptable false alarm rate. The processing algorithms may contain correlation filters, Kalman filters, clutter maps and other known radar processing tools. The target detection processor 30 provides real-time data indicative of the position of the detected targets to a target data interface 32 which operates in conjunction with a track and display unit 34.

The beacon receiver unit 26 is tuned to receive target identity information from the transponder 16 and to provide a signal to a correlation processor 36. To determine the identity of the target from ID information within the spectrum of the receive signal, the correlation processor detects a synchronize (SYNC) signal and decodes a binary phase-shift keying signal (BPSK) which are both embedded within the receive signal. Immediately after a SYNC signal is transmitted by the transponder, the BPSK ID data can be transmitted using the well known modulation technique wherein the phase of the carrier signal is phase shifted either 0° or 180° to encode the ID date. The correlation processor 36 decodes the encoded ID data and provides a decoded signal indicative of the target's identity to the target data interface 32 which combines the ID information with the detected target's position data from the detection processor 30. One of ordinary skill in the art will recognize that proper decoding of the encoded ID data requires a precise phase reference. The target data interface 32 bundles the identity and position information of the detected target and provides it to the track and display unit 34 for display to the airport ground controller. Thus, an advantage of the present invention is realized by the automatic integration of vehicle position data with data indicative of the vehicle's identity such as its registration number or flight number.

The ground radar 11 also includes an exciter 38 which supplies a pulsed RF signal having a frequency value $f_c$ on line 40 where $f_c$ is equal to the carrier frequency value. Typical carrier frequencies $f_c$ are about 15.7–17.7 GHz (Ku band) with a pulse repetition frequency (PRF) of about 16 KHz. An interrogation exciter 42 generates and provides a pulsed RF interrogation signal on a line 41 having a carrier frequency of $f_2$ also within the Ku band which is then amplified by the radar transmitter 24 and radiated by the antenna 18. The pulsed RF signal on the line 40 and the pulsed RF interrogation signal on the line 41 are multiplexed and amplified by the transmitter 24 (e.g., a TWT) which provides a resultant amplified RF signal to the antenna 18 which radiates the signals into free space. While the present invention is described in connection with the $K_u$ band, one skilled in the art will appreciate that the invention is not necessarily so limited and that any band L through $K_a$ may be used. However, surface detection radars generally operate at either X or $K_u$ band, and $K_u$ band is preferred since the ASDE system currently operates within the $K_u$ band. Circular polarization is preferred due to its inherent rejection of rain clutter.

Figure 3:
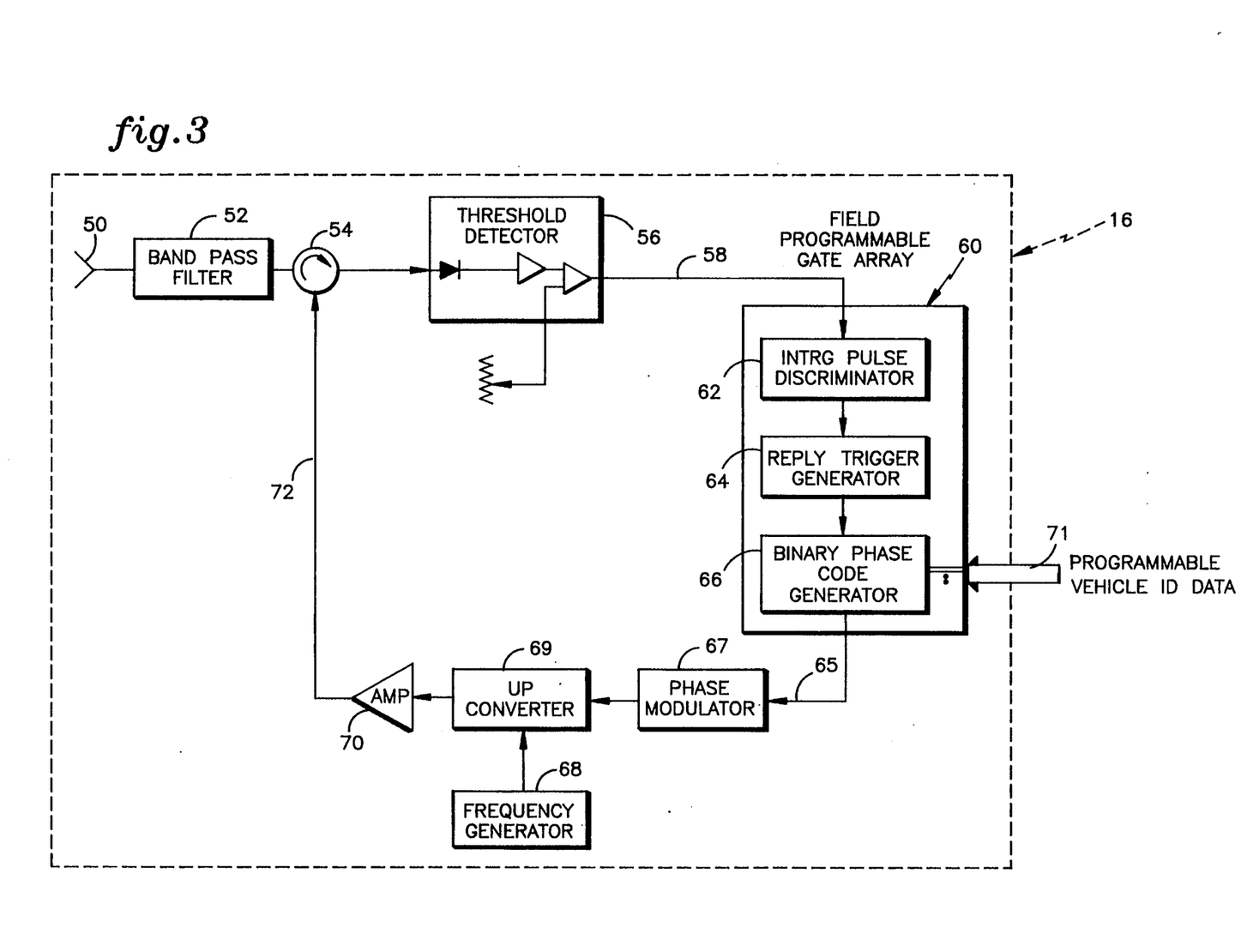
FIG. 3 is a functional block diagram of the vehicle transponder.

Referring to FIG. 3, the aircraft mounted transponder 16 includes a receive/transmit antenna 50 and a bandpass filter 52 that provides a filtered receive signal to a circulator 54. If the radar operates at $K_u$ band, the bandpass filter should have a passband of about 500 MHz centered at approximately 15.95 GHz to filter both the receive and transmit signals. The circulator 54 routes the filtered receive signal to a variable level threshold detector 56 which provides a detected signal on a line 58 to a field programmable gate array 60. The gate array 60 processes the detected signal on the line 58 to determine if the transponder should respond with ID data indicative of the vehicle it is associated with.

The gate array 60 includes an interrogation pulse discriminator 62 which decodes the detected signal on the line 58 and determines if the detected signal is a valid interrogation signal from the ground radar. If it is, the reply trigger generator 64 executes a random process to determine if the reply will be transmitted. The random occurrence of replies makes it possible for the interrogating ground radar to acquire closely spaced vehicles, replies from which could otherwise synchronously garble each another. As an example, if several aircraft are queued up on a taxiway waiting to enter the active runway for takeoff, the aircraft will be fairly close together and as a result more than one aircraft may reply with ID data in response to each receiving the interrogation signal. The occurrence of random replies in response to an interrogation signal helps to ensure several aircraft or other vehicles are not transmitting ID data to the ground radar at the same time. Using a narrow radiated azimuth beam (e.g., 3-dB beamwidth of about 0.25°) also helps to reduce the number of vehicles responding at the same time to an interrogation signal.

The reply trigger generator 64 enables the generation of a coded identity signal which is generated and output on the line 65 by a binary phase code generator 66. The identity signal is received over a data bus 71 such as ARINC 429 or 629, MIL-STD-1553. As an example, the transponder may receive ID data indicative of the aircraft flight number from the aircraft flight management system (FMS) via the data bus 71. The phase code generator 66 provides an encoded signal on the line 65 to a phase modulator 67 which modulates the phase of a signal provided by a frequency generator 68 and is bandshifted upward in frequency (e.g., to $K_u$ band, preferably $f_2$) by up converter 69. The up converter 69 provides an encoded signal to a power amplifier 70 which provides an encoded transponder transmit signal on a line 72 which is filtered and routed to the antenna 18.

An advantage of the present invention is the ease with which it may be incorporated into existing aircraft. One proposed transponder embodiment involves replacing an aircraft exterior light with an integrated unit which functions as both a light and a transponder. This integrated unit can be designed as a one-for-one replacement for the existing aircraft light. Due to the advances in miniaturization of electronic and RF circuitry, the transponder 16 (FIG. 3) can be placed into a package small enough to fit within a housing of an aircraft light with little of no modification to the dimensions of the light. This allows aircraft to be quickly and easily equipped with a transponder without cutting into the fuselage.

Figure 4A:
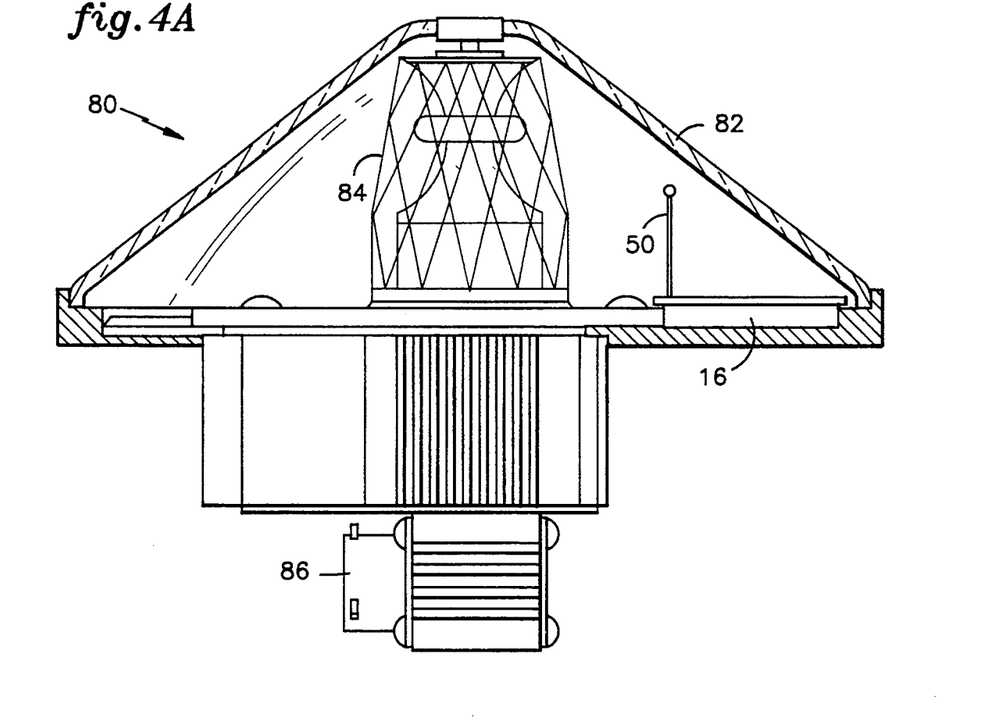
FIGS. 4A & 4B illustrate side views of an integrated collision avoidance strobe light/transponder.
Figure 4B:
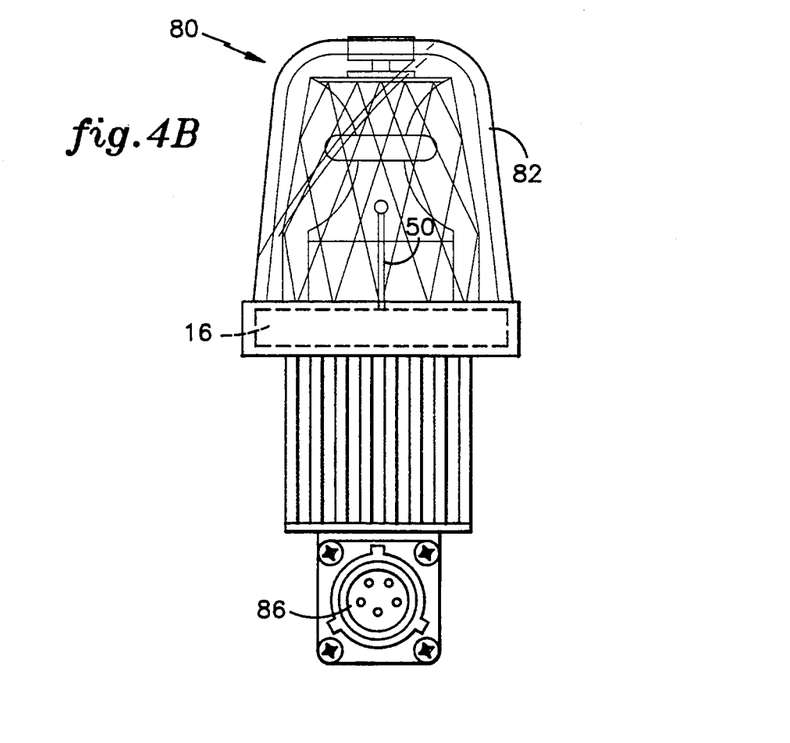

FIG. 4A illustrates a side view of a detailed embodiment on an integrated anti-collision strobe light/transponder 80 (hereinafter "the integrated unit") which mounts into a conventional aircraft strobe light receptacle. The integrated unit 80 includes a transparent housing 82 inside of which is mounted a flash tube 84 and the transponder 16 (FIG. 3). The integrated unit also includes an electrical connecter 86 which mates with the aircraft light receptacle. FIG. 4B illustrates another side view of the integrated unit 80. An example of the transmit and receive signals is now in order.

Figure 5:
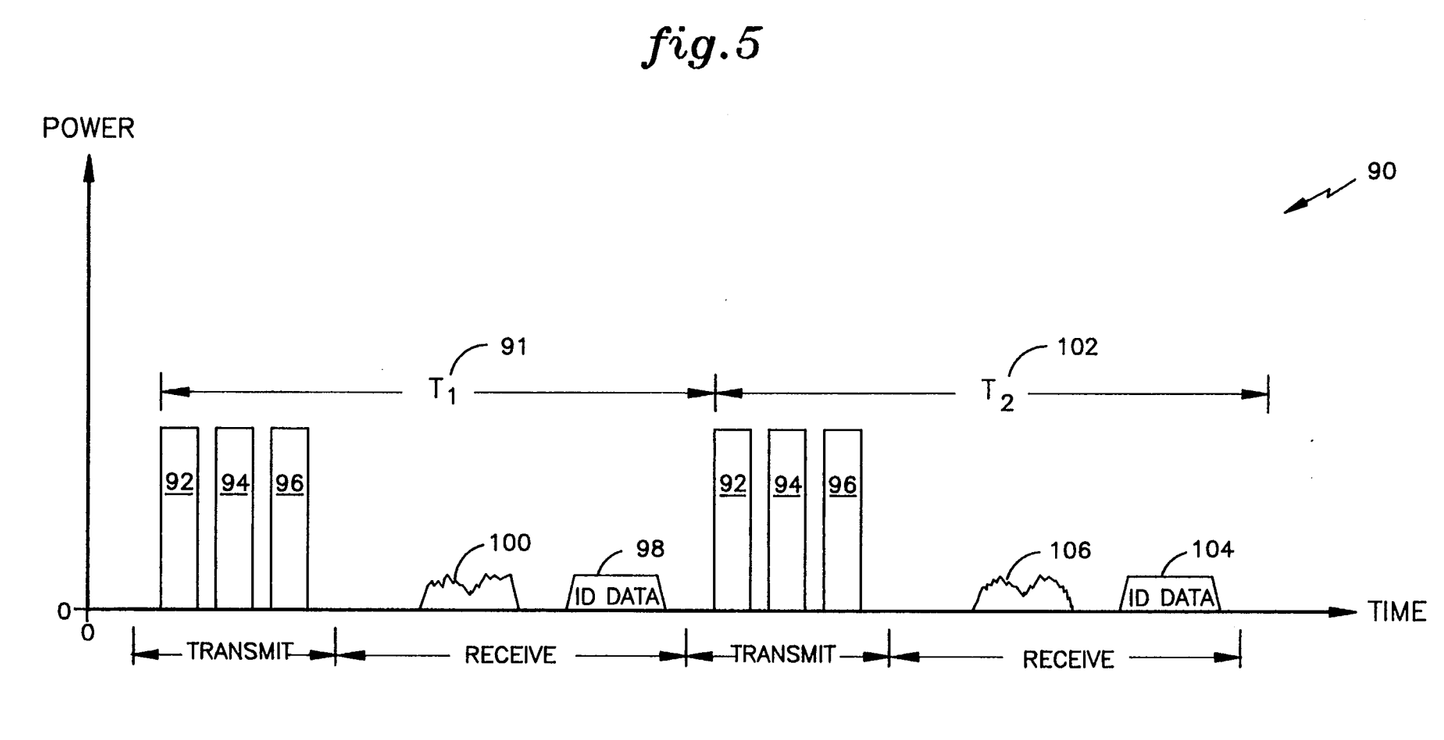
FIG. 5 is a plot of a series of electromagnetic pulses which are radiated from and received by the ground radar system illustrated in FIG. 1.

FIG. 5 is a plot 90 of a series of electromagnetic pulses which are radiated from and received by the ground radar system 11. Power is plotted along the vertical axis and time is plotted along the horizontal axis. In the first time period $T_1$ 91, pulses 92,94 represent interrogation pulses transmitted from the ground radar at carrier frequency $f_2$ while transmit pulse 96 represents the radar pulse at carrier frequency $f_c$ for detecting vehicles on the airport surface. In response to receiving the interrogations pulses 92,94 a vehicle will transmit an ID pulse 98 of electromagnetic energy whose information content contains unique vehicle ID data. Backscattered RF energy (i.e., target skin return) from the target is shown as a receive pulse 100 whose information content contains vehicle distance information. During a second time period $T_2$ 102 interrogation pulses 92,94 are again transmitted along with the transmit pulse 96. Since the rotating antenna has moved a fixed amount in azimuth from the start of the first time period $T_1$, a target different from the first target may be interrogated resulting in a second ID pulse 104 whose data content is indicative of the identity of the second target. Pulse 106 represents a second receive signal which is the backscatter return signal from a target. Note, the ID data (e.g. ID pulse 98) is transmitted by the transponder a fixed amount of time after receipt of the interrogation signal (e.g, 92,94) to ensure enough time is allowed for receipt of skin returns out to the unambiguous range of the radar. An example of the timing of the receive and transmit pulses is now in order.

Referring back to FIG. 1, during the first time period $T_1$ 91 the first aircraft 121 is interrogated and responds with its ID pulse 98. At the start of the second time period $T_2$ 102 the radar antenna 18 (FIG. 2) has rotated counter-clockwise an angular amount $\theta$ in azimuth from the start of the first time period $T_1$ which results in the second aircraft 13 being interrogated, and therefore the transponder 15 transmits the second ID pulse 104 whose data content is indicative of the second aircraft's 13 identity.

Figure 6:
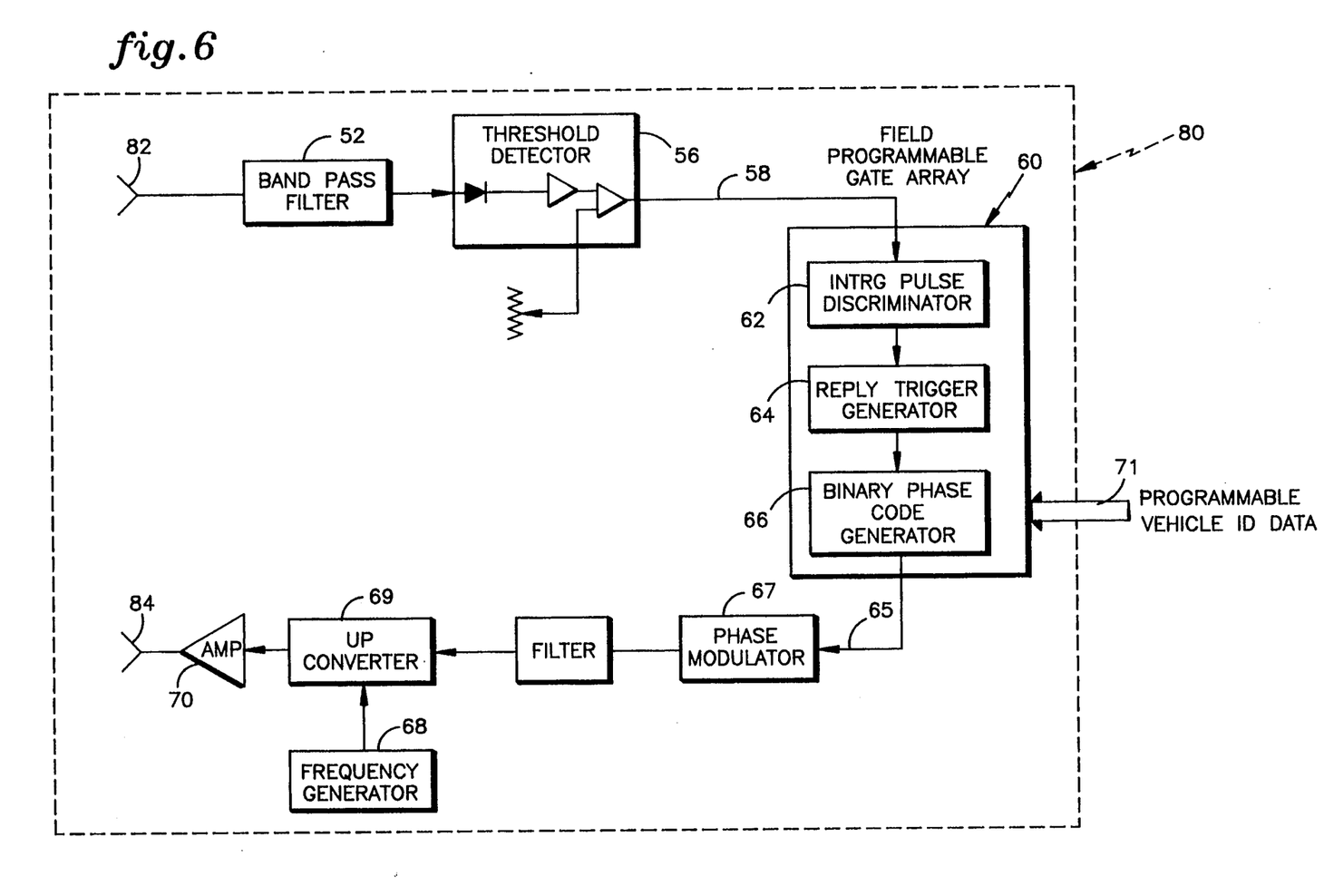
FIG. 6 illustrates an alternative embodiment transponder employing separate transmit and receive antennas.

FIG. 6 illustrates an alternative embodiment transponder 80 employing separate transmit and receive antennas. The embodiment illustrated in FIG. 6 has elements that are essentially the same as elements in illustrated in FIG. 3 and therefore the numerical designations remain the same wherever possible. The primary difference with the alternative embodiment illustrated in FIG. 6 is the use of both a receive antenna 82 and a transmit antenna 84.

While the present invention has been described with respect to the embodiments illustrated herein, and in particular the transponder embodiments, one of ordinary skill in the art will certainly appreciate that the invention is clearly not so limited and that in fact the transponder can be any transponder capable of interfacing with a ground surveillance radar system. As an example, the transponder does not have to co-located within an external aircraft light, the fuselage of the aircraft could be cut to allow mounting of the transponder. In addition, it may be possible to mount the transponder on the aircraft landing gear (with suitable G-shock and vibration protection), or the landing gear aircraft doors, since the present invention deals with aircraft on or within several hundred feet above the airport surface. Although obvious, it should be stated that the present invention is clearly not limited to the embodiment of the integrated unit illustrated herein.

In addition, the present invention is clearly not limited to transponders which employ BPSK modulation; any suitable well known modulation technique for encoding an RF signal can be used to provide the ID data to the ground radar system 11. The present invention is certainly not limited to the detection of only vehicles, the radar system may also be used to detect other targets such as humans beings, animals or even debris on the airport surface. While a pulsed radar system is the preferred embodiment, the present invention is also applicable to a CW radar. In addition, although a rotating ground radar antenna 18 is preferred due to cost, one could use an 360° electronically scanned array antenna. Incidentally, it will be appreciated there are many ways to provide ID data to the transponder other than the data bus 71. The ID data can be hard wired, pin programmable or any other of the well known ways for providing ID or signature data to an avionics unit.

All the foregoing changes and variations are irrelevant to the present invention, it suffices that an airport vehicle identification system includes a ground surveillance radar system which radiates both a conventional radar signal and a beacon interrogation signal, and receives a backscatter signal from the skin returns of a target and an encoded ID signal indicative of the target identity. The encoded ID signal is provided by a low power vehicle mounted transponder in response to receiving the beacon interrogation signal.

The present invention fills the critical void in airport traffic control of providing ground controllers with electronic airport surface surveillance data which includes both vehicle position and identity.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

We claim:

1. An airport vehicle identification system for detecting and identifying vehicles on the surface of an airport, comprising:
   a ground surveillance radar system which multiplexes and radiates both a conventional radar signal for detecting vehicles on the surface of the airport and a beacon interrogation signal, and which receives both a reflected skin return signal from a detected vehicle indicative of the vehicle's position and an encoded ID signal indicative of the vehicle's identity; and
   a vehicle mounted transponder for receiving and processing said beacon interrogation signal and for radiating said encoded ID signal when said beacon interrogation signal is valid.

2. The airport vehicle identification system of claim 1 wherein said vehicle mounted transponder is co-located within a housing of an external aircraft collision avoidance light.

3. The airport vehicle identification system of claim 2 wherein said ground surveillance radar system further comprises:
   an exciter for providing a pulsed electromagnetic signal having a certain pulse repetition factor and a carrier frequency $f_c$;
   an interrogation exciter for providing a pulsed electromagnetic interrogation signal having a carrier frequency $f_2$;
   means for multiplexing said pulsed electromagnetic signal and said pulsed electromagnetic interrogation signal, and for transmitting a resultant multiplexed signal;
   an antenna for radiating said resultant multiplexed signal, and for receiving said reflected skin return signal and said encoded ID signal;
   a radar receiver for detecting and processing said reflected skin return signal to determine vehicle position and provide a position signal indicative thereof;
   a beacon receiver tuned to detect and process said ID signal to determine vehicle identity, and provide a processed identity signal indicative thereof; and
   means responsive to said position signal and said processed identity signal, for providing indicia indicative of aircraft position and identity to an operator.

4. The airport surface vehicle detection system according to claim 3 wherein said carrier frequency values $f_c$ and $f_2$ are both within the Ku radar band.

5. An airport ground surveillance radar system which detects and determines the position of an aircraft on the surface of the airport, and receives ID information from the aircraft and provides an operator with indicia indicative of vehicle position and identity, the radar system comprising:
   means for generating i) a conventional radar signal having a carrier frequency value $f_c$ for detecting vehicles on the surface of the airport, and ii) a beacon interrogation signal having a carrier frequency signal $f_2$ which interrogates the aircraft for ID information;
   means for multiplexing said conventional radar signal and said beacon interrogation signal and for providing a multiplexed signal;
   RF means for transmitting and radiating said multiplexed signal;
   means for receiving both a reflected aircraft skin return signal indicative of the aircraft position and an aircraft ID signal indicative of the aircraft identity;
   means for signal processing said aircraft ID signal to decode the aircraft identity and for providing a decoded ID signal indicative thereof;
   means for processing said reflected aircraft skin return signal to determine the aircraft position and for providing an aircraft position signal indicative thereof; and
   means responsive to said decoded ID signal and said aircraft position signal for providing indicia indicative of aircraft position and identity.

6. The airport ground surveillance radar system of claim 5 wherein said carrier frequency signal values $f_c$ and $f_2$ are both within the Ku radar frequency band.

7. The airport ground surveillance radar system of claim 5 wherein said carrier frequency values $f_c$ and $f_2$ are both within the frequency range of about 15.7 to 17.7 GHz.

8. The airport ground surveillance radar system of claim 7 wherein said means for receiving includes i) a beacon receiver (26) which detects said aircraft ID signal and ii) a radar receiver (28) which detects said reflected aircraft skin return signal.

9. The airport ground surveillance radar system of claim 7 wherein said RF means for transmitting and radiating radiates said multiplexed in a narrow pencil beam having a 3-dB bandwidth of about 0.25 degrees.

10. An integrated aircraft collision avoidance/transponder unit which receives a beacon interrogation signal from a ground surveillance radar and transmits an aircraft ID signal to the ground surveillance radar in response thereto, said integrated unit comprising:
    a non-opaque housing;
    a flash tube mounted within said non-opaque housing which emits light through said non-opaque housing; and
    an aircraft transponder having an omni-directional antenna mounted within said non-opaque housing, means for receiving a beacon interrogation signal and for decoding said beacon interrogation signal, and means for transmitting and radiating said aircraft ID signal in response to a valid beacon interrogation signal.

11. The integrated aircraft collision avoidance/transponder unit of claim 10 further comprising means for varying the time period from detection of a valid interrogation signal and to transmission of said aircraft ID signal.

12. The integrated aircraft collision avoidance/transponder unit of claim 11 wherein means for receiving operates is tuned to receive a signal having a carrier frequency signal value within the frequency range of about range 15.7 GHz to 17.7 GHz.

13. The integrated aircraft collision avoidance/transponder unit of claim 12 wherein said means for transmitting includes means for providing a carrier frequency signal value within the frequency range of about 15.7 GHz to 17.7 GHz.

14. The integrated aircraft collision avoidance/transponder unit of claim 13 wherein said housing is transparent.

15. The integrated aircraft collision avoidance/transponder unit of claim 14 wherein said means for varying comprising a reply trigger generator which executes a random process in response to a valid interrogation signal to determine when said aircraft ID signal will be transmitted.

* * * * *